3,285,957
DIPHENYL SEMICARBAZIDES
Joseph Willard Baker, Kirkwood, and Raymond Eugene Stenseth, Webster Groves, Mo., assignors to Monsanto Company, a corporation of Delaware
No Drawing. Filed Feb. 13, 1964, Ser. No. 344,539
5 Claims. (Cl. 260—554)

This invention relates to a novel class of diphenyl semicarbazides. More particularly, this invention is concerned with a class of new organic compounds which are, 1,4-diphenyl semicarbazides wherein each of the phenyl groups contains at least one halogen substituent. Such semicarbazides are found to possess useful and unexpected biological activity.

The novel compounds of this invention have the general formula,

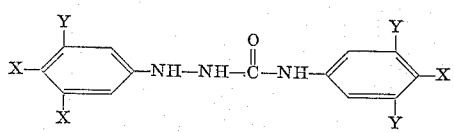

wherein each X is selected from the group consisting of chlorine and bromine, and each Y is selected from the group consisting of hydrogen, chlorine and bromine. As is apparent from said formula, the total number of halogen substituents is from three to six.

The semicarbazides of this invention can be prepared by causing a halophenyl isocyanate to react with a substantially equimolar amount of a halophenyl hydrazine. The reactants are generally heated, although specific reaction temperatures will vary depending primarily upon the particular isocyanate and hydrazine employed. In practicing such preparations, it is preferred to use an inert organic solvent for the reactants. Among the suitable solvents are benzene, toluene, xylene, hexane, heptane, octane, ethyl ether, tetrahydrofuran, dioxane, trichloroethylene and the like.

The invention will be more fully understood by reference to the following examples which are set forth herein solely for the purpose of illustration, and they are not to be construed as limiting the scope of the present invention.

Example I

A suitable reaction vessel is charged with 1.9 grams (0.01 mol) of 3,4-dichlorophenyl isocyanate, 1.8 grams (0.01 mol) of 3,4-dichlorophenyl hydrazine and 200 ml. of ether. The reactants are mixed and heated to reflux temperature. The heating is continued for a period of about three hours, during which time solids are formed. The reaction mixture is then cooled, and the solids are collected by filtration. Said solids are recrystallized twice from toluene to yield 1,4-bis(3,4-dichlorophenyl) semicarbazide, M.P. 204–205° C.

Example II

Following the procedure set forth in Example I, the reactants employed are 2.2 grams (0.01 mol) of 3,4,5-trichlorophenyl isocyanate and 2.70 grams (0.01 mol) of 3,4-dibromophenyl hydrazine. The product obtained is identified as 1-(3,4-dibromophenyl)-4-(3,4,5-trichlorophenyl) semicarbazide.

Example III

Following the procedure set forth in Example I, the reactants employed are 3.9 grams (0.02 mol) of 4-bromophenyl isocyanate and 6.9 grams (0.02 mol) of 3,4,5-tribromophenyl hydrazine. The product obtained is identified as 1-(3,4,5-tribromophenyl-4-(4-bromophenyl) semicarbazide.

Example IV

Following the procedure set forth in Example I, the reactants employed are 2.8 grams (0.01 mol) of 3,4-dibromophenyl isocyanate and 1.8 grams (0.01 mol) of 3,4-dichlorophenyl hydrazine. The product obtained is identified as 1-(3,4-dichlorophenyl)-4-(3,4-dibromophenyl) semicarbazide.

Example V

A suitable reaction vessel is charged with 3.5 grams (0.02) mol of 3,4-dichlorophenyl hydrazine, 3.1 grams (0.02 mol) of 4-chlorophenyl isocyanate and 250 ml. of ether. The reactants are mixed and heated to reflux temperature. The heating is continued for about one hour, during which period solids are formed. The reaction mixture is then cooled, and the solids are collected by filtration. Said solids are washed with ether and dried. Recrystallization from chlorobenzene yields 1-(3,4-dichlorophenyl)-4-(4-chlorophenyl) semicarbazide, M.P. 215–216° C.

Example VI

Following the procedure set forth in Example V, the reactants employed are 2.2 grams (0.01 mol) of 3,4,5-trichlorophenyl isocyanate and 2.1 grams (0.01 mol) of 3,4,5-trichlorophenyl hydrazine. The product obtained is identified as 1,4-bis(3,4,5-trichlorophenyl) semicarbazide.

As noted above, the semicarbazides of this invention possess useful biological activity. They are particularly effective in controlling the growth of bacterial organisms. In a representative test, both 1,4-bis(3,4-dichlorophenyl) semicarbazide and 1-(3,4-dichlorophenyl)-4-(4-chlorophenyl) semicarbazide were shown to be active against *Staphylococcus aureus*. The latter displayed effective control of the organism at a dilution in excess of one part per one hundred thousand, and the former displayed such control at a dilution in excess of one part per one million. Similar activity is shown by other and different semicarbazides of this invention.

The above-illustrated control of bacterial organisms is both unexpected and unpredictable. The presence of the halogen atoms at the 3 and 4 positions of the azino phenyl ring, and also the presence of a halogen atom at the 4 position of the carbamoyl phenyl ring, appear to be the significant factors. In order to demonstrate the distinctive nature of the limited group of semicarbazides of this invention, a number of closely related compounds were prepared and tested against the same bacterial organism.

Such related compounds include: (a) 1-phenyl-4-(3,4-dichlorophenyl) semicarbazide (J. Am. Chem. Soc., vol. 79, p. 1245); (b) 1-(3,4-dichlorophenyl-4-phenyl semicarbazide; (c) 1-(3,4-dichlorophenyl)-4-phenyl thiosemicarbazide; (d) 1-(3,4-dichlorophenyl)-4-(3-chlorophenyl) semicarbazide; and (e) 1-(3,4-dichlorophenyl)-4-(2,4,6-trichlorophenyl) semicarbazide. Compounds (a), (b) and (e) were found to have a maximum effective dilution of only one part per one thousand, while Compounds (c) and (d) were ineffective even at that relatively high concentration.

While the invention has been described herein with regard to several specific embodiments, it not so limited. It is to be understood that modifications and variations of said invention, obvious to those skilled in the art, may be made without departing from the spirit and scope as hereinafter defined.

The embodiments of the invention in which an exclusive property or privilege is claimed are defined as follows:

1. A compound of the formula,

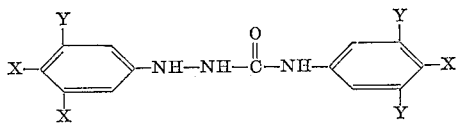

wherein each X is selected from the group consisting of chlorine and bromine, and each Y is selected from tne group consisting of hydrogen, chlorine and bromine.

2. 1,4-bis(3,4-dichlorophenyl) semicarbazide.
3. 1,4-bis(3,4-dibromophenyl) semicarbazide.
4. 1-(3,4-dichlorophenyl)-4-(4-chlorophenyl) semicarbazide.
5. 1-(3,4-dibromophenyl)-4-(4-bromophenyl) semicarbazide.

References Cited by the Examiner

UNITED STATES PATENTS

| | | | |
|---|---|---|---|
| 2,658,062 | 11/1953 | Jones | 260—554 X |
| 2,855,435 | 10/1958 | Grillot et al. | 260—544 |
| 2,959,615 | 11/1960 | Lum et al. | 260—544 |
| 3,021,258 | 2/1962 | Haynes | 167—30 |
| 3,113,070 | 12/1963 | Pluijgers et al. | 167—30 |

OTHER REFERENCES

Beaver et al.: J. Amer. Chem. Soc., vol. 79 (1957), pages 1236–45.

ALEX MAZEL, *Primary Examiner.*

HENRY R. JILES, *Assistant Examiner.*